(12) United States Patent
Crow

(10) Patent No.: US 12,729,706 B2
(45) **Date of Patent: *Sep. 8, 2026**

(54) HOLLOW WALL FASTENER

(71) Applicant: Greg M. Crow, Corona, CA (US)

(72) Inventor: Greg M. Crow, Corona, CA (US)

( * ) Notice: Subject to any disclaimer, the term of this patent is extended or adjusted under 35 U.S.C. 154(b) by 390 days.

This patent is subject to a terminal disclaimer.

(21) Appl. No.: 18/511,972

(22) Filed: Nov. 16, 2023

(65) Prior Publication Data

US 2024/0084835 A1 Mar. 14, 2024

Related U.S. Application Data

(63) Continuation of application No. PCT/US2022/029826, filed on May 18, 2022.

(60) Provisional application No. 63/190,013, filed on May 18, 2021.

(51) Int. Cl.
*F16B 13/08* (2006.01)

(52) U.S. Cl.
CPC ................................ *F16B 13/0808* (2013.01)

(58) Field of Classification Search
CPC ......................... F16B 13/0808; F16B 13/0858
See application file for complete search history.

(56) References Cited

U.S. PATENT DOCUMENTS 1,094,911 A 4/1914 Lautenbacher et al.
1,210,451 A 1/1917 France
2,404,169 A 7/1946 Gidden
3,285,118 A * 11/1966 Elkins ................. F16B 13/0808 411/346
3,350,976 A 11/1967 Topf
3,481,242 A 12/1969 Topf
3,766,356 A 10/1973 Feldmann
4,242,564 A 12/1980 Kendall
4,465,039 A 8/1984 Snelgrove et al.
4,834,601 A 5/1989 Schaap
5,409,336 A 4/1995 Jericevich et al.
5,417,531 A 5/1995 Brown (Continued)

FOREIGN PATENT DOCUMENTS

GB 2639250 A * 9/2025 ............ F16B 13/002

OTHER PUBLICATIONS

WingIts https://www.homedepot.com/p/WingIts-World-s-Strongest-Fastener-Standard-6-Anchors-RC-MAW35-6/202727991.

*Primary Examiner* — Vishal A Patel
(74) *Attorney, Agent, or Firm* — Kirk A. Buhler; Buhler & Associates Patenting

(57) ABSTRACT

Improvements in a hollow wall fastener that uses a cylindrical outer casing with an outer lip to distribute vertical load stress to the wall more efficiently by reducing high-load stress points and centering mass nearer the wall. The fastener uses arms that deploy and install in a reaching and spreading motion that allows the center of tension and load to remain closer to the wall. The housing uses channeled grooves that align the arms with the cylindrical outer casing. The fastener is adjustable prior to installation to set the thickness of the wall for an optimal grip. The arms secure the fastener by direct pressure applied from opposite directions along the z-axis, perpendicular to the interior wall. The arms can be retracted back into the cylindrical outer housing for removal of the fastener from the wall, ceiling, or floor.

13 Claims, 4 Drawing Sheets

(56) References Cited

U.S. PATENT DOCUMENTS

| | | | | |
|---|---|---|---|---|
| 5,509,765 | A | 4/1996 | Albin | |
| 5,991,984 | A | 11/1999 | Schaty | |
| 6,004,088 | A | 12/1999 | Hunt | |
| 6,494,653 | B2 | 12/2002 | Remmers | |
| 6,623,225 | B1 * | 9/2003 | Groenendijk | F16B 13/0866 411/21 |
| 9,303,669 | B2 | 4/2016 | Agri et al. | |
| 9,989,080 | B1 * | 6/2018 | Kunken | F16B 13/0808 |
| 2014/0271031 | A1 * | 9/2014 | Agri | F16B 13/0808 29/525.01 |

* cited by examiner

HOLLOW WALL FASTENER

CROSS REFERENCE TO RELATED APPLICATIONS

This application claims priority to International PCT Application PCT/US2022/029826 filed on May 18, 2022, and claims priority to provisional application Ser. No. 63/190,013 filed May 18, 2021, the entire contents of which is hereby expressly incorporated by reference herein.

TECHNICAL FIELD

This invention relates to improvements in wall fasteners. More particularly, the present hollow wall fastener creates a high-capacity, reusable, multipurpose mounting system for attaching, joining, and hanging objects on or from hollow backed load-supporting surfaces.

BACKGROUND ART

When an object is being mounted to a hollow wall there are several possible solutions from adhesives on the outer surface of the hollow wall, nails, screws, and fasteners that expand within the hollow opening behind a wall. When an expanding faster is used, a hole is created in the wall and a portion of the fastener passed into the hole and expanded or deformed. The deformed part usually bends outward or over the wall to grip the fastener in the hollow wall. Depending upon the type of expanding fastener, the load carrying capacity and the ability to remove the fastener will change the construction of the expanding fastener or expanding wall anchor.

A number of patents and or publications have been made to address these issues. Exemplary examples of patents and or publication that try to address this/these problem(s) are identified and discussed below.

U.S. Pat. No. 1,094,911 issued on Apr. 28, 1914 to J. C. Lautenbacher & A. Geary and is titled Cover Retainer for Receptacles. This patent discloses a three-locking-fingers that are spread to retain the cover in the receptacle. While patent discloses three fingers that are spread with a screw, it does not work to retain the mechanism on a hollow wall.

U.S. Pat. No. 5,417,531 issued on May 23, 1995 to Gordon A. Brown and is titled Locking Cain Anchor Apparatus. This patent discloses a reusable anchor apparatus removably securable to a panel. The reusable anchor apparatus includes a housing having an inner end, an outer end, a longitudinal axis extending therebetween, and a restraining member preventing insertion of the housing completely through the panel. The reusable anchor further includes a first finger pivotally coupled to the inner end of the housing, a second finger pivotally coupled to the inner end of the housing, opposing the first finger, and a plunger for moving the first finger and the second finger between a retracted position in which the fingers extend substantially parallel to the longitudinal axis. While this patent has two expanding fingers, a cam blocks access to the interior space thereby preventing a user from hanging something from the outside of the anchor.

U.S. Pat. No. 5,991,984 issued on Nov. 30, 1999 to Harald Schaty and is titled Holder made of Plastic Material with Pivotal Holding Elements. This patent discloses a plastic holder having a base and a journal formed thereon. The plastic holder further having a holding element. The holding element includes an articulating bore for receiving the journal of the base. The journal includes a smaller cross section than the articulating bore. The holding element is pivotable about the journal and positionable into a basic position and a locked position. While this patent has holding elements, the depth of the holding elements is fixed and is not adjustable for different thickness of hollow walls.

What is needed is a hollow wall fastener that is adjustable based upon the thickness of the wall and can also be removed from the wall if needed. The proposed hollow wall fastener provides the solution with an expanding fastener that uses a plurality of fingers that spread in the hollow wall to grip the wall between the cosmetic surface and behind the wall.

DISCLOSURE OF THE INVENTION

It is an object of the hollow wall fastener to be a high-capacity, reusable, multipurpose mounting system for attaching, joining, and hanging objects on or from hollow-backed load-supporting surfaces such as walls, ceilings, or floors. The hollow wall fastener uses a cylindrical outer casing with an outer lip to distribute vertical load stress to the wall more efficiently by reducing high-load stress points and centering mass nearer the wall.

It is an object of the hollow wall fastener to use arms that deploy and install in a reaching and spreading motion that allows the center of tension and load to remain closer to the wall. It also ensures that all arms are loadbearing as it more effectively balances loads between the arms. Arm orientation produces a unique distribution of force which is more parallel to the wall, more like a washer. The arms lock into place by between the arm base top plate and the anvil face. The shape applies force on both the top and bottom of the arms. The hollow wall fastener is a vise applied to the wall. This protects drywall integrity & durability, maximizing the wallboard's weight-bearing capacity.

It is another object of the hollow wall fastener for the depth of the arm deployment to be adjusted for a full range of standardized & custom wall depths. Specific sizes add the precision necessary for the unique arm contact angles.

It is another object of the hollow wall fastener to use channeled grooves that align the arms with the cylindrical outer casing. The arms secure the fastener by direct pressure applied from opposite directions along the z-axis, perpendicular to the interior wall. This is accomplished by two screw-nuts squeeze the arm in place. The locked arm point can be moved along the case tracks (threading) for placement in the optimal deployment position. The arms can be retracted back into the cylindrical outer casing for removal of the fastener from the wall or ceiling.

It is still another object of the hollow wall fastener to accept a removable exterior cap that centers and supports the fastening bolt to eliminate bolt sag when under load. The cap channel acts as a secondary connection point for the fastener bolt. The threaded cap creates connection points on both the interior (anvil) & exterior (cap) of the wall. The cap directly integrates other mounting or load-bearing products. When built into the cap, attached items have more threaded contact area when connected to the anchor. These may still be paired with a bolt to anvil connection for even greater strength. Examples of these utility caps include shelving brackets, utility hooks, rope/cable pulleys, articulating multi-position posts, and more. The cap can have a decorative purpose with a unique shape, materials, finishes & colors for visual appeal. The cap can also be used with an O-ring or seal to provide an airtight, or waterproofed seal on the wall, ceiling, or floor.

Various objects, features, aspects, and advantages of the present invention will become more apparent from the following detailed description of preferred embodiments of the invention, along with the accompanying drawings in which like numerals represent like components.

BRIEF DESCRIPTION OF THE DRAWING(S)

BEST MODE FOR CARRYING OUT THE INVENTION

Figures 1, 1A, 1B:
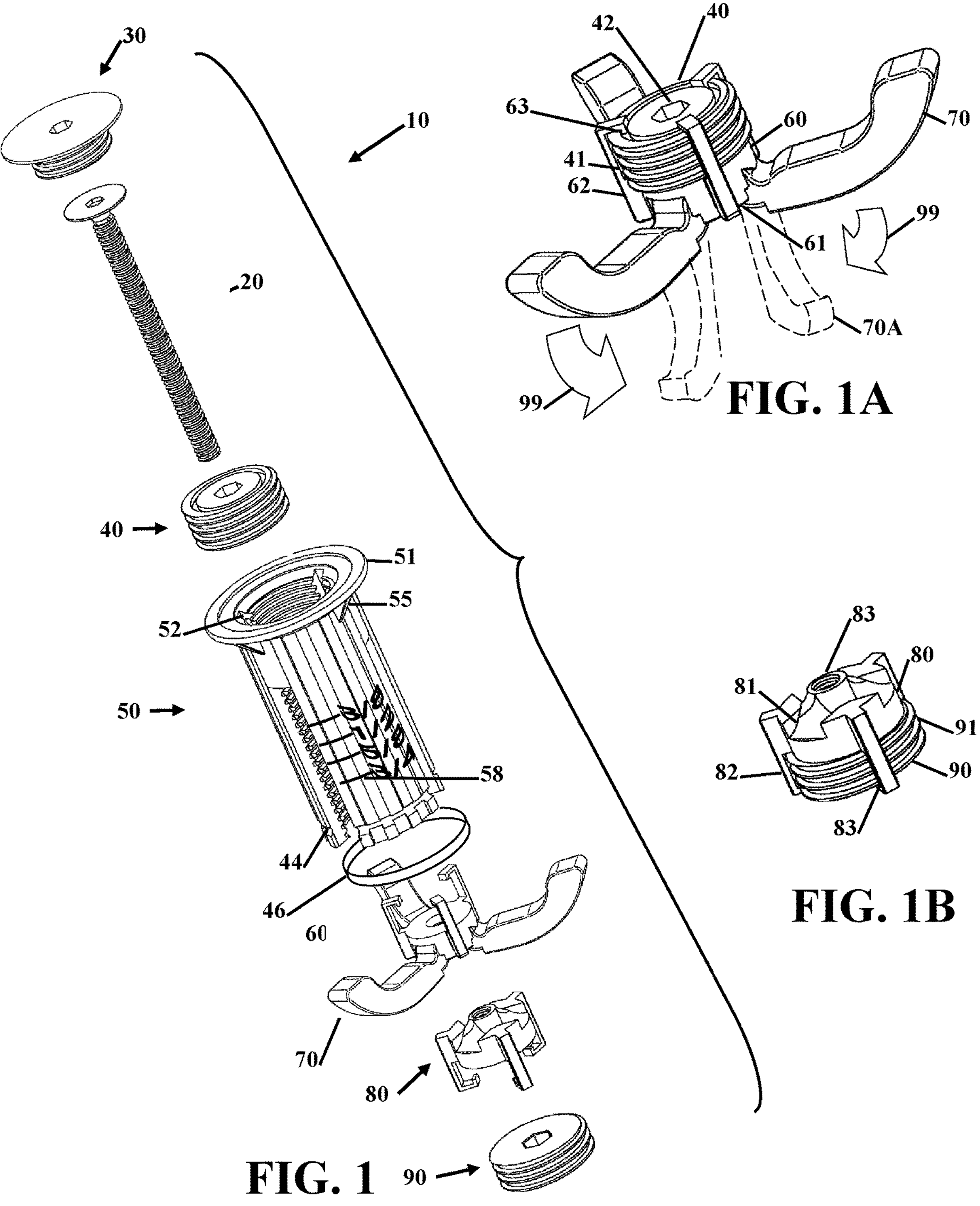
FIG. 1 shows an exploded perspective view of the hollow wall fastener.
FIG. 1A is a perspective view of the arm base engaged in the base screw-nut.
FIG. 1B is a perspective view of the anvil on the anvil screw-nut.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing embodiments only and is not intended to be limiting of the technology. As used herein, the singular forms "a," "an," and "the" are intended to include the plural forms as well, unless the context clearly indicates otherwise.

It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters.

| Item Numbers and Description |
|---|
| 10 hollow wall fastener |
| 20 threaded fastener |
| 21 head |
| 22 threaded shaft |
| 30 exterior cap |
| 31 socket |
| 32 lip |
| 33 threaded body |
| 34 hole |
| 35 recess |
| 40 base screw nut |
| 41 threads |
| 42 through hole |
| 44 ring recess |
| 46 ring |
| 50 hollow body |
| 51 top lip |
| 52 linear slot |
| 53 inner recess |
| 54 arm slot |
| 55 wing |
| 56 bottom lip |
| 57 cylindrical body |
| 58 indicia |
| 59 threaded |
| 60 arm base |
| 61 body |
| 62 vertical tab(s) |
| 63 tab stop(s) |
| 64 through hole |
| 69 pin |
| 70 arm(s) |
| 70A arm rotated |
| 71 arm stop |
| 73 arm end |
| 74 arm |
| 75 shoulder |
| 76 shoulder |
| 78 stop |
| 80 anvil |
| 81 body recess |
| 82 vertical tab(s) |
| 83 tab stop(s) |
| 84 threaded hole |
| 90 anvil screw-nut |
| 91 threads |
| 92 through hole |
| 94 clamp |
| 95 out |
| 96 rotate/thread |
| 97 rotate/thread |
| 98 into |
| 99 rotated |
| 100 wall |
| 101 hole |

FIG. 1 shows an exploded perspective view of the hollow wall fastener 10. The components in this figure show the parts in a linear arrangement and in other figures the order of insertion and use is explained in more detail. Starting at the top of this figures in an exterior cap. The exterior cap 30 is a cover and can be designed to add utility and function demanded for a wide range of applications. The exterior cap 30 can be used for decorative purposes and made in unique shapes, materials, finishes & colors for visual appeal. The exterior cap 30 can incorporate technologies such as wireless switches and led accent lighting.

The exterior cap 30 is configured to thread into the hollow casing and can be directly integrated or have other mounting or load-bearing products. The exterior cap 30 can be used to attach items that require more threaded contact area when connected to the anchor. The exterior cap 30 may be paired with a bolt to anvil connection for even greater strength.

Examples of these utility caps include shelving brackets, utility hooks, rope/cable pulleys, articulating multi-position posts, and more.

Under the exterior cap 30 a threaded fastener 20 is shown. The threaded fastener 20 passes through a base screw nut, through an arm base and threads into an anvil 80. The base screw-nut 40 has a threaded exterior that is configured to thread into the hollow body 50. The hollow body 50 has a hollow cylindrical body with an upper top lip 51 that is configured to sit on exterior of a hollow wall, while the cylindrical body passes through a hole in the hollow wall. The underside of the hollow casing has a plurality of wings 55 that are configured to grip the exterior surface of the wall to prevent the hollow body 50 from rotating. Within the hollow casing are a plurality of linear slots 52. The exterior of the hollow body 50 is shown with indicia 58 that allows for setting the hollow wall fastener 10 to be used with different thicknesses of walls. There is a ring recess 44 for ring 46 to retain the cylindrical shape of the hollow body 50. Below the hollow body 50 is the arm base 60 with a plurality of arm(s) 70 that pivot from the arm base 60. Below the arm base 60 is anvil 80 with interior threads for the threaded fastener 20. Below the anvil 80 is an anvil screw-nut 90.

FIG. 1A is a perspective view of the arm base 60 engaged in the base screw-nut 40. The arm base 60 has a wafer body 61 with a plurality of vertical tab(s) 62 that extend from the body 61. Each of the vertical tabs 62 terminate with tab stop(s) 63 that are configured to capture and retain the base screw-nut 40 therein. The vertical tabs(s) 62 exist on the exterior of the threads 41 of the base screw-nut 40 to allow the based screw-nut to spin within the arm base 60. The vertical tab(s) 62 are configured to slide with the linear slot(s) 52 in the hollow casing 50 (not shown in this figure). The base screw-nut 40 has a central through hole 42 that is configured for a hex-head wrench to engage in the through hole 42 to turn or thread the sub-assembly of the base screw-nut, arm base 60 and the arm(s) 70 within the hollow casing 50. The base screw-nut 40 can be unthreaded from within the hollow casing 50 to withdraw the arms 70 to remove the hollow wall fastener 10.

Under the arm base 60 several arm(s) 70 are connected or secured. In the embodiment shown the arm(s) 70 are connected to the arm base 60 with pivoting pins but could also be secured with a living hinge. At the end of the arm(s) 70 is an arm stop 71 that is configured to contact an inside of a hollow wall. This figure shows some of the arm(s) 70 extended and rotated 99 as rotated arm(s) 70A.

FIG. 1B is a perspective view of the anvil 80 on the anvil screw-nut 90. The anvil 80 has a curved or tapered body recess 81 that is configured to spread the arm(s) 70 (not shown in this figure). The tapered body recess 81 and the vertical tabs 82 are move up and into the anvil 80. At the underside of the anvil 80 are a plurality of vertical tab(s) 82 that extend from the body of the anvil. Each of the vertical tabs 82 terminate with tab stop(s) 83 that are configured to capture and retain the anvil screw-nut 90 therein. The vertical tabs(s) 82 exist on the exterior of the threads 91 of the anvil screw-nut 90 to allow the anvil screw-nut 90 to spin within the anvil 80. The vertical tab(s) 82 are configured to slide with the linear slot(s) 52 in the hollow casing 50 (not shown in this figure). There is a "loose" connection of the anvil screw-nut 90 in the vertical tab(s) 82 of the anvil 80.

Figures 2, 3, 4:
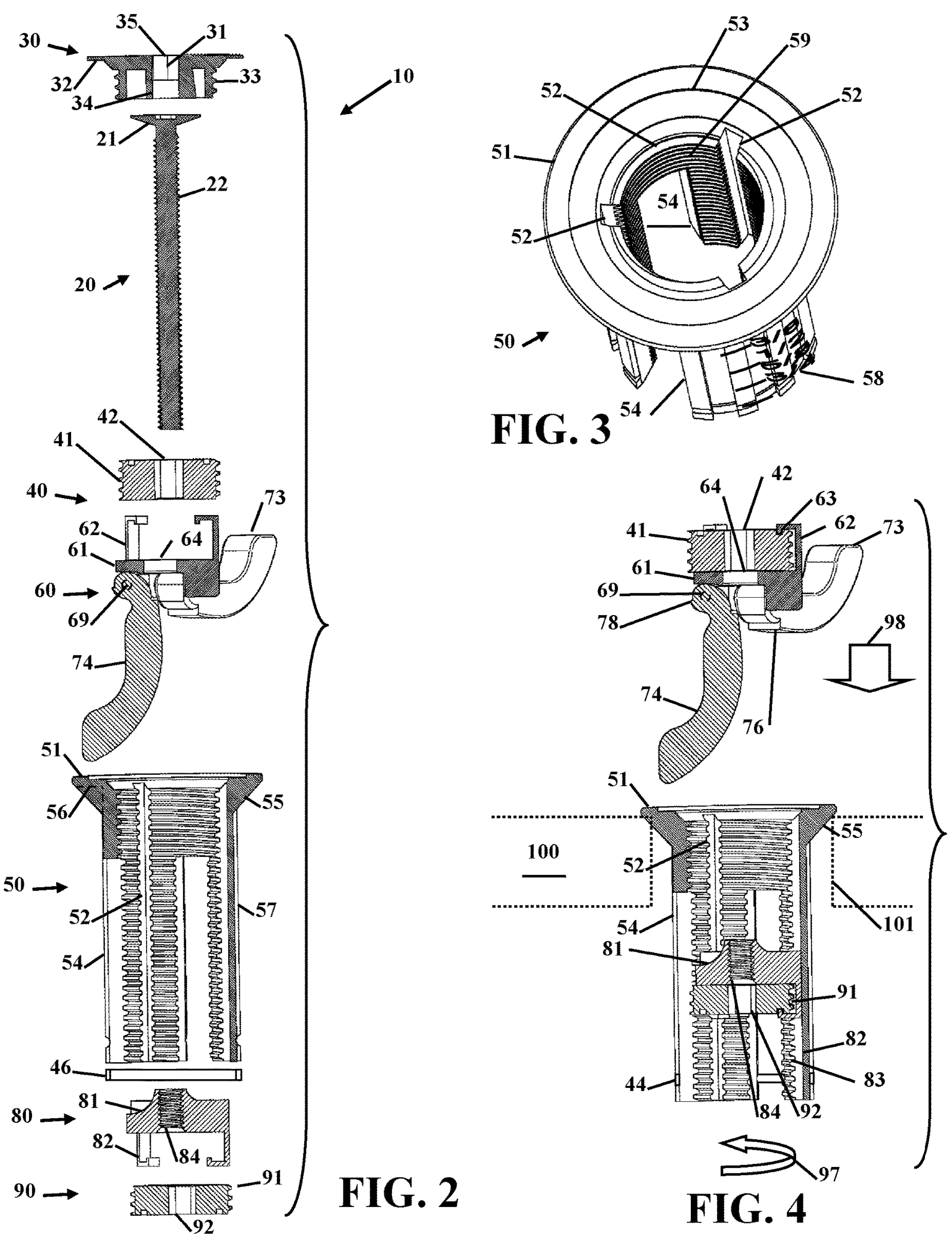
FIG. 2 is an exploded cross-section of the hollow wall fastener.
FIG. 3 is a perspective view of the hollow body.
FIG. 4 is a sectional view of inserting the slider into the hollow body.

FIG. 2 is an exploded cross-section of the hollow wall fastener 10 in the order the parts are assembled, and FIG. 3 is a perspective view of the hollow body 50. Starting with the hollow body 50, the hollow body 50 is a flanged cylindrical body 57 with a top lip 51. Within the top lip 51 is an inner recess 53. The interior of the hollow body 50 is threaded 59 for the base screw-nut 40 and the anvil screw-nut 90 to engage. The interior of the hollow body has a plurality of linear slots 52 for the vertical tab(s) 62 and the vertical tab(s) 82 to resist rotation of the arm base 60 and the anvil 80, respectively. The three linear slot 52 channel grooves along interior length of the hollow body 50 stabilize the base and anvil to ensure that the arm(s) 70 align with hollow body 50 openings for deployment. This essentially ensures the correct base/anvil to arm curvature alignment. The linear slots 52 also provide precise knowledge of arm 70 positions. Rotating the case will ensure arms 70 are in the ideal position.

The hollow body 50 also has a plurality of arm slot(s) 54 where the arm(s) pivot from the arm base 60. From FIG. 2 the anti-rotation wings 55 are shown on the bottom lip 56. The overhanging bottom lip 56 rim squeezes wall surfaces around drilled wall opening to reinforce and support the wall. The exterior of the hollow body 50 is shown with indicia 58 that allows for setting the hollow wall fastener 10 to be used with different thicknesses of walls.

The threaded fastener 20 has a head 21 with an elongated threaded shaft 22 that is configured to pass through the through hole 42 of the base screw-nut 40, through the through hole 64 of the arm base 60 and thread into the threaded hole 84 in the anvil 80. The threaded fastener will force the arms 74 to pivot on the pin 69 and spread through the arm slot(s) 54 in the hollow body 50 to force the arm end 73 to the interior of a wall. The end of each articulating arm has a pad, cushion, gripper, spike or textured surface.

The position of the anvil screw-nut 90 and the anvil 80 within the hollow body 50 is set by aligning "snapping" the vertical tab(s) 82 of the anvil 80 onto the anvil screw-nut 90. Then aligning the vertical tab(s) 82 with the linear slot(s) 52 and threading the threads 91 of the anvil screw-nut 90 into the threads in the cylindrical body 57 to place the body recess 81 on the anvil 80 at the desired location. The through hole 92 in the anvil screw-nut is a hex shape to allow for a hex wrench to be used to set the position of the anvil 60 within the hollow body 50.

The position of the arm base 60 changes the spread of the arm(s) 74 as they pass through the arm slot(s) 54. A ring 46 fits around the bottom of the hollow body. The vertical tab(s) 62 of the body 61 are aligned with the linear slot 52 and then the threads 41 of the base screw-nut 40 are turned into the hollow body 50. The through hole 42 in the base screw-nut 40 is a hex shape to allow for a hex wrench or removal tool to be used to set the position of the base screw-nut 40 within the hollow body 50.

To enclose the opening of the hollow wall fastener 10 the threaded body 33 of the exterior cap 30 is treaded into the hollow body 50. The lip 32 is configured to recess within the inner recess on the hollow body 50. The exterior cap 30 has a socket 31 for a hex head wrench to install or remove the exterior cap 30. The exterior cap 30 may include a threaded or through hole 34 for securing items to the exterior cap 30 and may further include recess 55 in the outer surface.

FIG. 4 is a sectional view of inserting the slider into the hollow body 50. A hole 101 is first created in the hollow wall 100. The flange of the hollow body 50 is placed into the hole 101 and seated so the wing(s) 55 seat in the wall 100. The combination of the anvil screw-nut 90 and the anvil 80 are rotated or threaded 97 into the hollow body 50 to the desired location. The combination of the base screw-nut 40 and the arm base with the arm(s) 70 are inserted into the hollow body 50. This figure shows the ring recess 44 with a restraining ring around the bottom of the hollow body 50.

Figures 5, 6, 7:
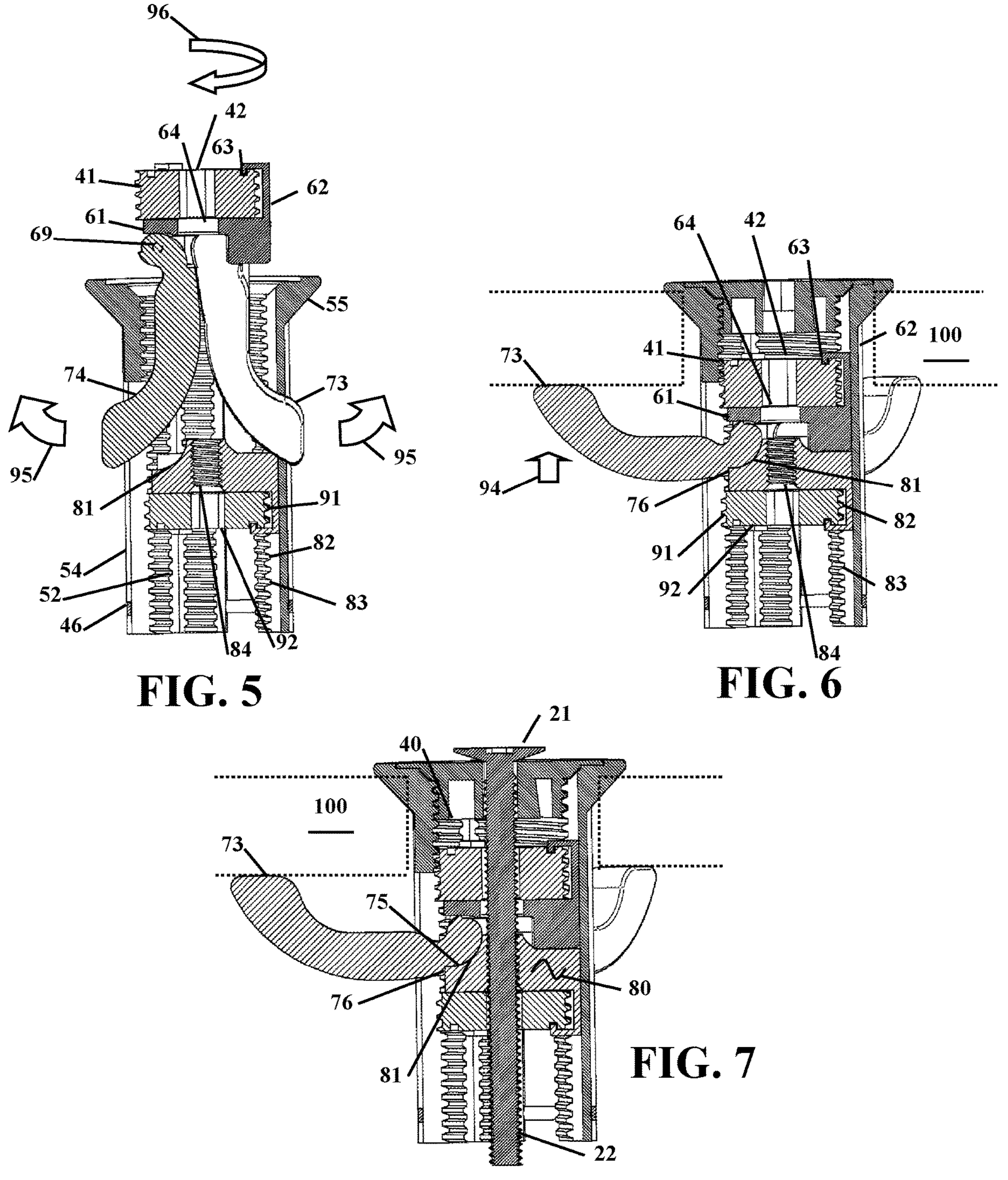
FIG. 5 is a sectional view of the arms entering the arm slot(s).
FIG. 6 is a sectional view of the arms extended through the arm slot(s) in the hollow body.
FIG. 7 is a sectional view showing the threaded fastener locking the arm(s).

FIG. 5 is a sectional view of the arms 74 entering the arm slot(s) 54. As the ends of the arm(s) 74 are pushed down onto the body recess 81 of the anvil 80 the arm(s) 74 will move out 95 through the arm slot(s) 54 in the hollow body 50. The body 61 of the arm base 60 will pass into the hollow body 50. The vertical tab(s) 62 will align with the linear slot(s) 52 in the hollow body 50 and then the threads 41 of the base screw-nut will engage in the threads of the hollow body 50. The base screw-nut 40 can then be rotated or turned 96 to drive the arm sub-assembly into the hollow body 50 to pivot the arms 74 on the arm base 60 and spread the arms 74 out 95. Ring 46 is shown around the bottom of the hollow body 50 in a recess.

FIG. 6 is a sectional view of the arms 70 extended through the arm slot(s) 54 in the hollow body 50. The arms(s) 70 have arm stop(s) 71 that track in the body recess 81. A shoulder 76 prevents further rotation of arm 70. In this figure, the arm ends 73 contact the inside of the wall 100 to clamp the hollow wall fastener 10 in the hollow wall 100. There is a "loose" connection of the anvil screw-nut 90 in the vertical tab(s) 82 of the anvil 80. To lock the arms 70 the threaded fastener is used to "pull" the anvil 80 towards the base screw-nut. The arms 70 deploy and install in a reaching and spreading motion that allows the center of tension and load to remain closer to the wall. It also ensures that all arms 70 are loadbearing as it more effectively balances loads between the arms. Arm 70 orientation produces a distribution of force which is parallel to the wall 100. The hollow wall fastener 10 produces a wider interior contact area which distributes weight over a larger surface area. A stop 78 limits rotation of the arm 70 when the stop 78 contacts the underside of the arm base 60.

FIG. 7 is a sectional view showing the threaded fastener 20 locking the arm(s) 70. The threaded fastener 20 threads into the anvil 80, slides the anvil 80 in the hollow body to "pull" the anvil 80 towards the head 21 of the threaded fastener into the base screw-nut 40. This also forces the shoulder 75 of the arm(s) 70 into the body recess 81. A shoulder 76 prevents further rotation of arm 70. The arm(s) 70 are primarily deployed and retracted by the base anvil 80 and its connected screw-nut's 90 movement. The anvil 80 movement is minimal and only intended to remove any potential slack to account for variances in thickness/depth present despite its stated standardized wall thickness. The hollow wall fastener in now locked onto the wall 100. The variable arm curvature matches the curvatures found on both vise plates for maximum surface contact. The snug fit eliminates arm slippage along the x-axis. Top arm 70 shape eliminates arm shift along the y-axis. Small tab extensions on the arm 70 also serve to reduce arm movement when installed. The hollow wall fastener can also be completely removed or adjusted from the wall 100 in the reverse order.

Figure 8:
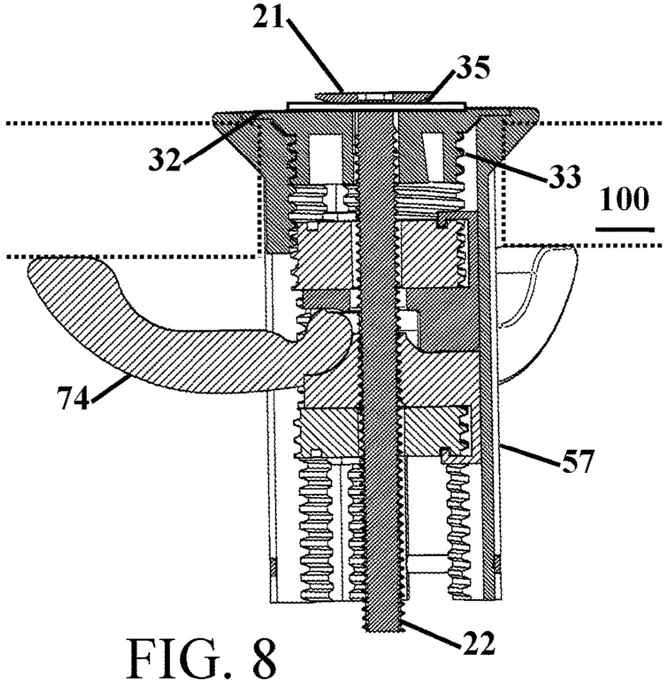
FIG. 8 is a sectional view of showing the hollow wall fastener installed with aa cover cap.

FIG. 8 is a sectional view of showing the hollow wall fastener installed with a cover cap 30. The threaded body 33 of the cover cap 30 can now be threaded into the hollow body 50 using a hex key or other driver to secure the cover cap 30 onto the hollow wall fastener. The arm(s) 70 are secured by direct pressure applied from opposite directions along the z-axis, perpendicular to the interior wall 100. Essentially the two screw-nuts 40 and 90 squeeze the arm(s) 70 in place. The locked arm point can be moved along the case tracks (threading) for placement in the optimal deployment position. This feature maximizes performance for a range of wall thicknesses. The cap 30 can be placed on products such as shower rods, handrails, staircase rails, cabinets, light fixtures & more. The cap 30 can further include a fire-proof material or an O-ring to seal the wall 100.

Figure 9:
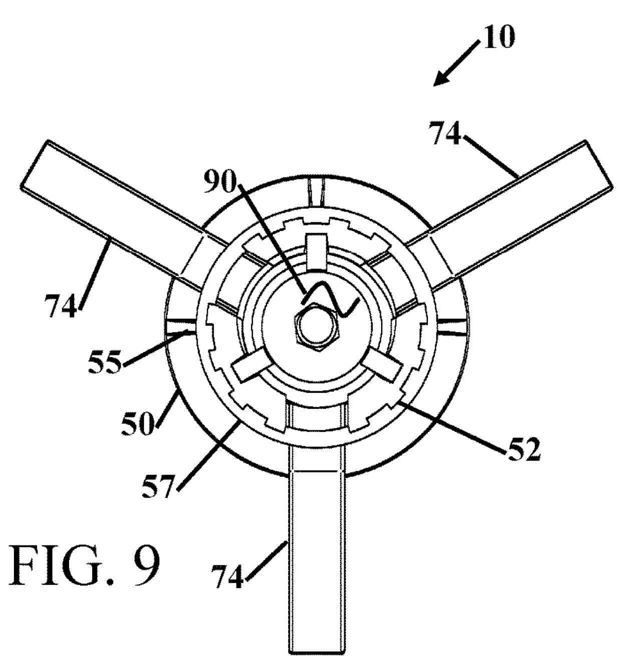
FIG. 9 is an inside wall view showing the hollow wall fastener locked onto a hollow wall.

FIG. 9 is an inside wall view showing the hollow wall fastener locked onto a hollow wall with the arm(s) 74 spread behind the wall. The linear slot(s) 52 can be seen from this bottom view of the cylindrical body 57 along with the wing(s) 55 that prevent undesired rotation of the hollow wall fastener. This view also shows the bottom of the anvil screw-nut 90.

In the preferred embodiment the components are made from a plastic material, but other materials are contemplated including, but not limited to carbon fiber, zinc, aluminum, and steel. The arm 70 length is not limited by the length of the hollow body 50. This allows for a wider range of applications than current anchor variants could ever allow. The hollow wall fastener 10 does not restrict the arm(s) 70 length. The arm(s) 70 may be 2 times, 3 times, or greater than the total hollow body 50 length. It is contemplated that the hollow wall fastener can utilize the load-bearing potential of ceiling crossbeams. The hollow body 50 can be matched with 18" arms to bridge and hang over the beams. While the hollow wall fastener 10 is shown and described with three arms 70 it is contemplated that the hollow wall fastener 10 can be made with two arms 70 or more than three arms 70.

Thus, specific embodiments of a hollow wall fastener have been disclosed. It should be apparent, however, to those skilled in the art that many more modifications besides those described are possible without departing from the inventive concepts herein. The inventive subject matter, therefore, is not to be restricted except in the spirit of the appended claims.

INDUSTRIAL APPLICABILITY

The industrial applicability relates to wall fasteners for hollow walls.

The invention claimed is:

1. A hollow wall fastener comprising:

a hollow body having a flange at a first end;

said hollow body having a second end that is configured to pass into a hollow wall; an anvil that is configured to pass into said second end of said hollow body;

an arm base having a plurality of articulating arms that are configured to pass at least partially through corresponding holes in said hollow body, wherein said anvil and said arm base with said plurality of articulating arms are configured to push said articulating arms out to spread said plurality of articulating arms out through said corresponding holes in said hollow body to clamp said hollow body onto said hollow wall;

at least one screw-nut that is securable to said arm base;

wherein said anvil has a body recess for each articulating arm that clamps each articulating arm into said arm base; and wherein each articulating arm and said base are driven together by said at least one screw-nut.

2. The hollow wall fastener according to claim 1, wherein said hollow body includes a threaded internal body.

3. The hollow wall fastener according to claim 1, wherein said hollow body has at least two internal linear slots.

4. The hollow wall fastener according to claim 1, further includes an exterior cap which is configured to thread into said hollow body and said exterior cap is configured with a hollow interior threaded cylinder that centers and supports an anchor that is configuration to provide an attachment point on an exterior of said hollow wall.

5. The hollow wall fastener according to claim 1, wherein said articulating arms are pulled and retract into said hollow body as said base screw nut is unthreaded into said hollow body.

6. The hollow wall fastener according to claim 1, wherein each said articulating arm includes a shoulder engages onto said arm base to stop rotation of said articulating arm.

7. The hollow wall fastener according to claim 1, further includes at least one wing that is configured to seat in said hollow wall.

8. The hollow wall fastener according to claim 1, wherein said hollow body includes indicia that is configured to set a thickness of said hollow wall.

9. The hollow wall fastener according to claim 1, further includes at least one ring that is configured to engage around said hollow body.

10. The hollow wall fastener according to claim 1, wherein there are at least three articulating arms.

11. The hollow wall fastener according to claim 10, wherein an end of each said articulating arm has a pad, cushion, gripper, spike or textured surface.

12. The hollow wall fastener according to claim 1, wherein said at least one screw nut is configured to turn independently from the arm base.

13. The hollow wall fastener according to claim 5, further includes a removal tool.

* * * * *